(12) United States Patent
Barker et al.

(10) Patent No.: US 10,534,708 B1
(45) Date of Patent: Jan. 14, 2020

(54) SHALLOW CACHE FOR CONTENT REPLICATION

(71) Applicant: Microsoft Technology Licensing, LLC, Redmond, WA (US)

(72) Inventors: Ross Neal Barker, Redmond, WA (US); Adrian Sufaru, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/017,985

(22) Filed: Jun. 25, 2018

(51) Int. Cl.
*G06F 12/0802* (2016.01)
*G06F 16/182* (2019.01)
*G06F 16/00* (2019.01)
*G06F 12/00* (2006.01)

(52) U.S. Cl.
CPC .......... *G06F 12/0802* (2013.01); *G06F 12/00* (2013.01); *G06F 16/00* (2019.01); *G06F 16/184* (2019.01); *G06F 2212/27* (2013.01)

(58) Field of Classification Search
CPC .. G06F 12/0802; G06F 2212/27; G06F 16/00; G06F 12/00; G06F 16/184
USPC ........ 707/634, 635, 692, 205; 709/212, 219; 711/162, 118
See application file for complete search history.

(56) References Cited

U.S. PATENT DOCUMENTS

| | | | |
|---|---|---|---|
| 7,373,345 B2 | 5/2008 | Carpentier et al. | |
| 7,444,389 B2 | 10/2008 | Kilian et al. | |
| 9,323,758 B1 | 4/2016 | Stacey et al. | |
| 9,729,659 B2 | 8/2017 | Sengupta et al. | |
| 2012/0131278 A1* | 5/2012 | Chang ................. | G06F 12/0893 711/118 |
| 2013/0191605 A1* | 7/2013 | Solihin ............... | G06F 12/0284 711/156 |
| 2015/0227543 A1 | 8/2015 | Venkatesh et al. | |
| 2015/0269183 A1 | 9/2015 | Avati | |
| 2017/0017727 A1* | 1/2017 | Seetharama ............ | G06F 3/067 |
| 2017/0091107 A1* | 3/2017 | Peterson ............. | G06F 12/0806 |
| 2018/0095985 A1 | 4/2018 | Zhang | |

FOREIGN PATENT DOCUMENTS

| | | |
|---|---|---|
| EP | 1513065 A1 | 3/2005 |
| EP | 1662408 A1 | 5/2006 |
| WO | 2009045767 A2 | 4/2009 |

OTHER PUBLICATIONS

"International Search Report and Written Opinion Issued in PCT Application No. PCT/US2019/036217", dated Sep. 19, 2019, 10 pages.

* cited by examiner

*Primary Examiner* — Hong C Kim

(57) ABSTRACT

Embodiments relate to efficiently replicating data from a source storage space to a target storage space. The storage spaces share a common namespace of paths where content units are stored. A shallow cache is maintained for the target storage space. Each entry in the cache includes a hash of a content unit in the target storage space and associated hierarchy paths in the target storage space where the corresponding content unit is stored. When a set of content units in the source storage space is to be replicated at the target storage space, any content unit with a hash in the cache is replicated from one of the associated paths in the cache, thus avoiding having to replicate content from the source storage space.

20 Claims, 9 Drawing Sheets

SHALLOW CACHE FOR CONTENT REPLICATION

BACKGROUND

Computing systems store and manage hierarchies of content units or data items. Each content unit in such a hierarchy or storage space has a path or location. The paths are all in a same namespace, and the content units can be accessed by referring to their paths. Often, portions of one storage space need to be copied to another storage space. That is, a set of content units at respective paths in a source storage space may be need to be copied to a target storage space sharing the same namespace. For example, a directory in a remote filesystem may need to be copied to a directory in a local filesystem.

Depending on the application or type of storage, same instances of a content unit might be stored in multiple paths in a storage space. In the case of filesystem files, there may be multiple files containing the same content but at different full paths in the file system. For instance, the same file content "X" might be stored at "\A\B" and at "\A\C\ D". Files "B" and "D" store the same content, but at different locations and with different file names.

When duplicating a set of paths and respective content units from a source storage space to a target storage space, the duplication of content units may have inefficiencies. The same content may be transferred from source to target multiple times. Referring to the example above, it would be redundant wasteful to copy both files "B" and "D" from source to target when they contain the same content. As only the inventors have observed, another inefficiency may occur when content units of a portion of source storage space to be transferred to target storage space already exist at the target storage space. For instance, if content units at "\A\B" and "\A\C" are to be transferred perhaps as a package, if the target storage space already contains the same content of say "\A\B", yet at a different local location such as "\D\E\F", the inventors have observed that transferring the content unit at "\A\B" is potentially avoidable since the same content is already available in the target storage space (at "\D\E\F").

Discussed below are techniques related to using a shallow cache to efficiently transfer packages or sets of content units or data items from source storage spaces to target storage spaces by leverage existing content at the target storage spaces.

SUMMARY

The following summary is included only to introduce some concepts discussed in the Detailed Description below. This summary is not comprehensive and is not intended to delineate the scope of the claimed subject matter, which is set forth by the claims presented herewith.

Embodiments relate to efficiently replicating data from a source storage space to a target storage space. The storage spaces share a common namespace of paths where content units are stored. A shallow cache is maintained for the target storage space. Each entry in the cache includes a hash of a content unit in the target storage space and associated hierarchy paths in the target storage space where the corresponding content unit is stored. When a set of content units in the source storage space is to be replicated at the target storage space, any content unit with a hash in the cache is replicated from one of the associated paths in the cache, thus avoiding having to replicate content from the source storage space.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
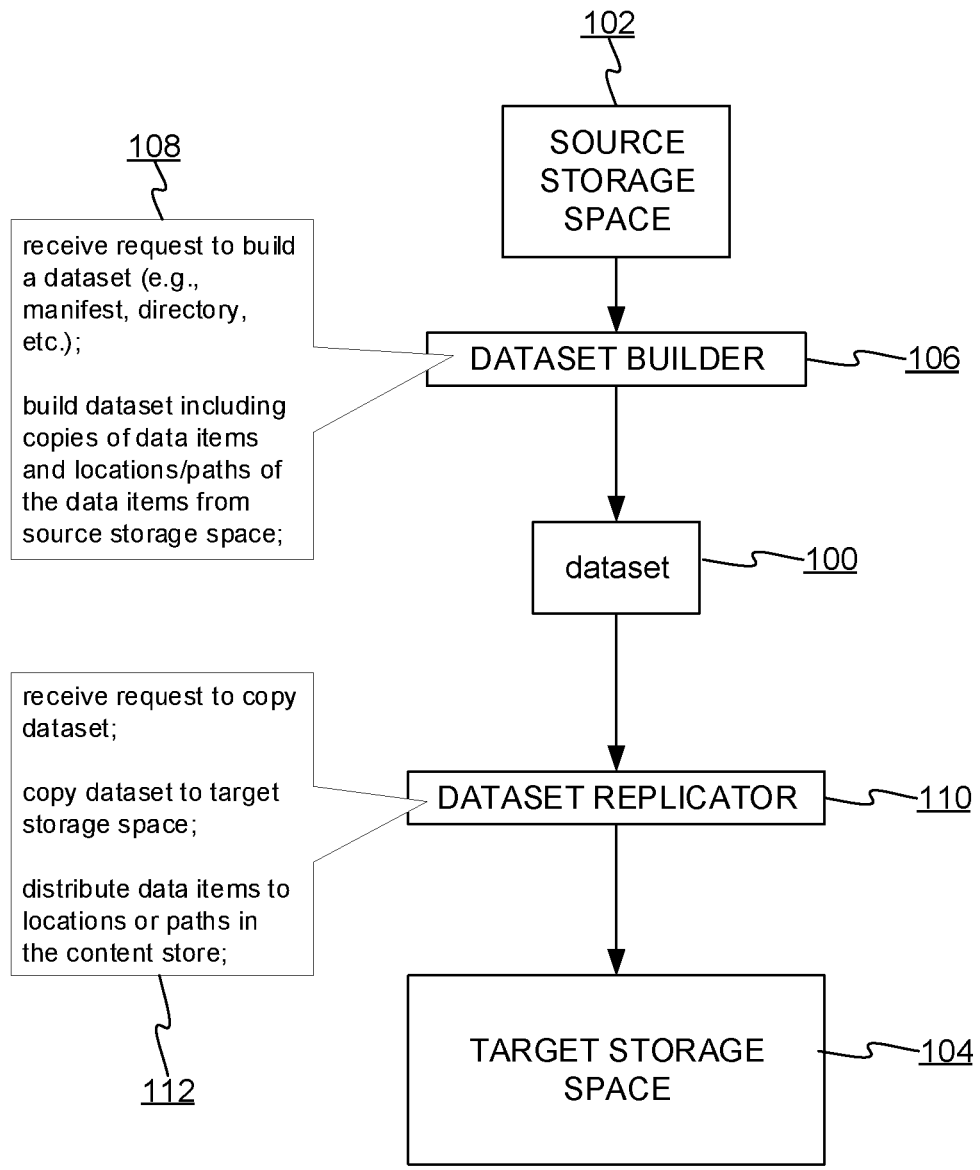
FIG. 1 shows a system for replicating a dataset of data items from a source storage space to a target storage space.

FIG. 1 shows a system for replicating a dataset 100 of data items from a source storage space 100 to a target storage space 102. The data items or content units may be any type of discrete unit of data such as files, memory chunks, media data, etc., so long as they are individually distinguishable and accessible. They may be of variable length or uniform size. The storage spaces 102/104 may be co-located on a same computing device or they may be on respective different computing devices connected by a network. Of note is that they share a same namespace. Moreover, storage spaces generally organize their content units in hierarchical fashion. Content units in a storage space may be arranged or located by names, paths, identifiers of tree nodes, etc. The term "paths" will be used hereafter to refer to these types of hierarchical location descriptors.

A common operation is to replicate a portion of a source storage space 102 to a target storage space 104. In concept, this involves duplicating a dataset 100 that includes a set of paths in the source storage space 102 and corresponding content units that reside at the paths in the source storage space 102. In the case of filesystems, the dataset 100 may be an entire directory or a set of disperse files.

In a typical system, the dataset 100 or other structuring of data for transfer may involve a software component such as a dataset builder 106 at the source side that collects the necessary data and information to allow a receiver to reconstruct the portion of source data that is being prepared. Any known packaging tools may be used. As described in detail later, the dataset 100 may be a combination of indicia of the portion of source data, for instance a manifest of content unit paths. The dataset 100 may optionally include copies of content units. In one embodiment a manifest is used, and the target side may use the manifest to decide which content units to pull on an as-needed basis.

The dataset builder 106 may perform a build process 108 that includes steps such as receiving a request to build the dataset and then building the dataset. The request may specify a set of paths, a path root or subtree, and so forth. In one embodiment, as discussed in more detail below, building the dataset 100 includes identifying content items that have the same content, providing an identifier for the content (e.g., a hash), and adding the identifier or hash and the corresponding source paths that contain the same corresponding content. In the case of a filesystem, the dataset 100 is a list of each unique hash in the dataset, and each hash is accompanied by a list of full pathnames of files with the same hash.

In a pull scenario where the target side pulls data from the source side, a data replicator process 110 or the like performs a replication process 112. The data replicator process 110 may include steps such as selecting the dataset 100, providing a request for the dataset 100 to the source side, copying at least indicia of the content in the dataset, and then copying the relevant content units from the source storage space 102 and distributing them to the correct namespace locations or paths in the target storage space 104.

The system shown in FIG. 1 is only an example. In different embodiments may perform the steps in different orders or at different places. It is possible for all of the building and replication to take place on the source side or the target side. Building and replication may be performed in a combined fashion.

Figure 2:
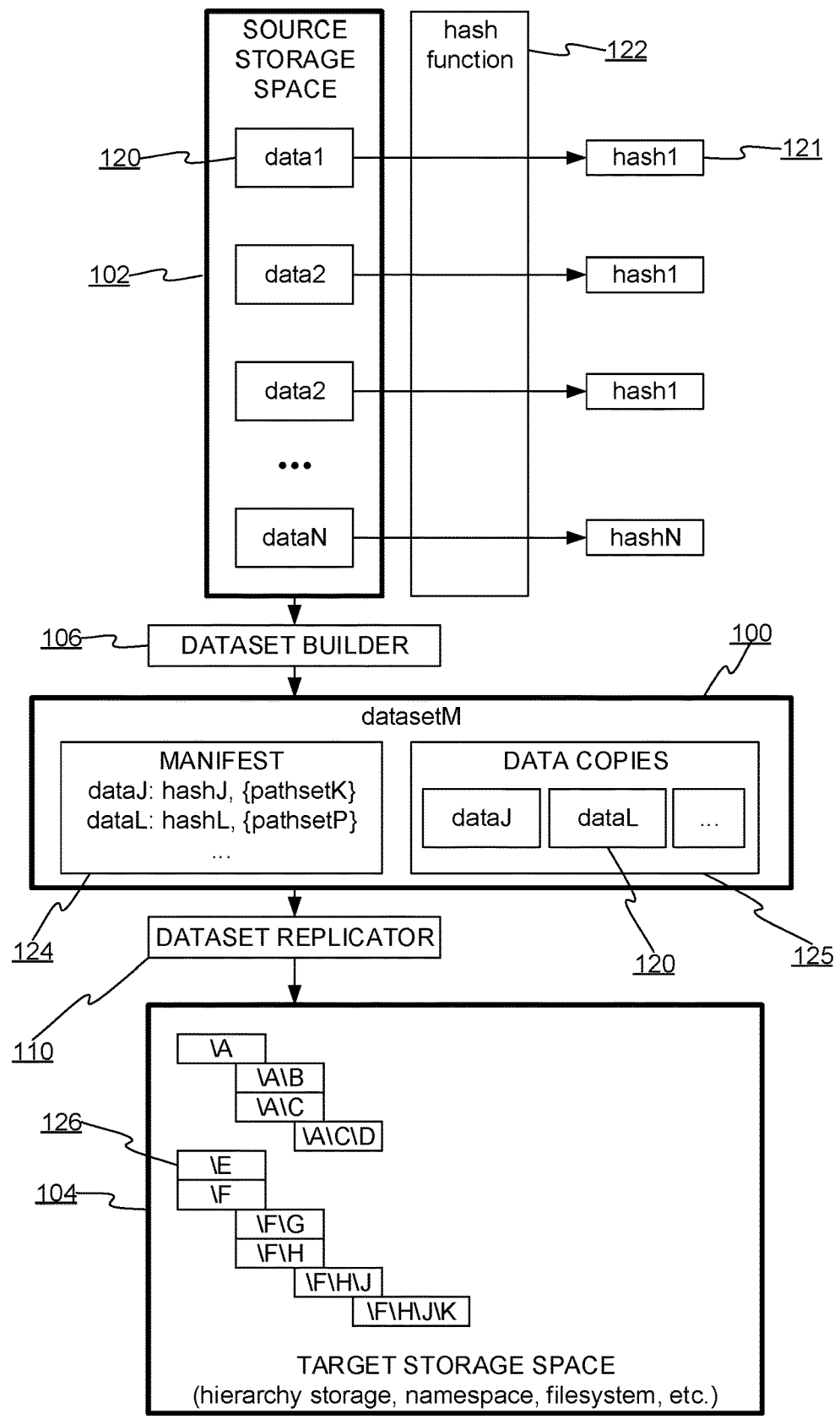
FIG. 2 shows additional detail of a dataset.

FIG. 2 shows additional detail of a dataset. As noted, the source storage space 102 stores content units 120. In one embodiment, the content units 120 may be stored in a hierarchy (not shown) using the same (or overlapping) namespace as that of the target storage space 104. The dataset builder 106 may start with a list of paths of content units to be built or packaged. A hash function 122 is applied to each content unit 120 at each path in the list creating hashes 121 for the respective content units. Hashing might be performed in advance on all content units in the source storage space. In either case, the dataset builder 106 builds a manifest 124 by consolidating the hashes of the listed content units. Specifically, any content units that have the same hash contain the same content. Such hash is added to the manifest 124 along with the set of all paths in the source storage space 102 of the respective content units having the same hash. The result is that the manifest 124 represents content units in groups that have the same content (and hash value).

In one embodiment, the dataset 100 may include copies of the relevant content units 120 in a data section 125. To minimize size, only one copy of content units having the same content is included.

The target storage space 104 stores content units in an organized hierarchy of paths 126. In the example shown in FIG. 2, path "\A\B" is the full path or location, in a namespace tree, of a content unit at node B. In the case of filesystems, the paths 126 are full or absolute paths in the filesystem. With the example path "\A\B", a file named "B" is stored at the path. The paths 126 may also be relative paths sharing a common sub-root. The dataset replicator 110, once instructed which dataset 100 to replicate, accesses the manifest 124. As described below, the dataset replicator 110 then determines which content units need to be transferred, either from the source storage space 102 or from the data section 125, as the case may be. From whatever source, including copies in the target storage space 104, the list of paths and respective content units are reproduced in the target storage space 104. Each path and its respective content unit that was included in the dataset 100 is duplicated in the namespace of the target storage space 104.

Figure 3:
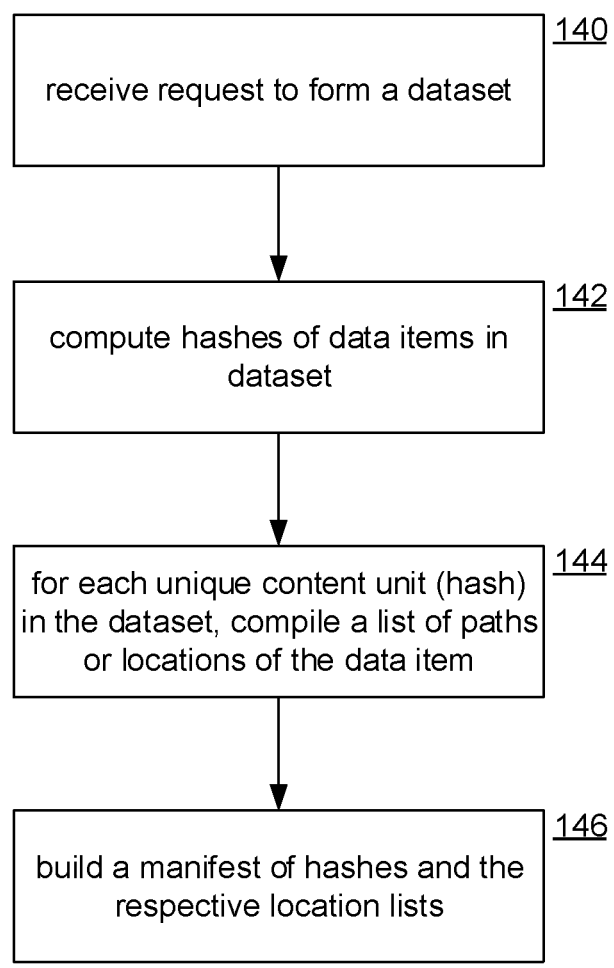
FIG. 3 shows a process for building a dataset.

FIG. 3 shows a process for building a dataset. At step 140 a request to form a dataset is received. The request includes a list of paths of content units or a reference to the same. At step 142, a hash is computed or acquired for each content unit in the request list. Any known hash function may be used for computing hashes. At step 144, for each unique hash in the dataset, a list of corresponding paths in the source data is compiled. At step 146, the manifest 124 is built with each content unit in the request list being represented as at least one path associated with a corresponding hash.

Figure 4:
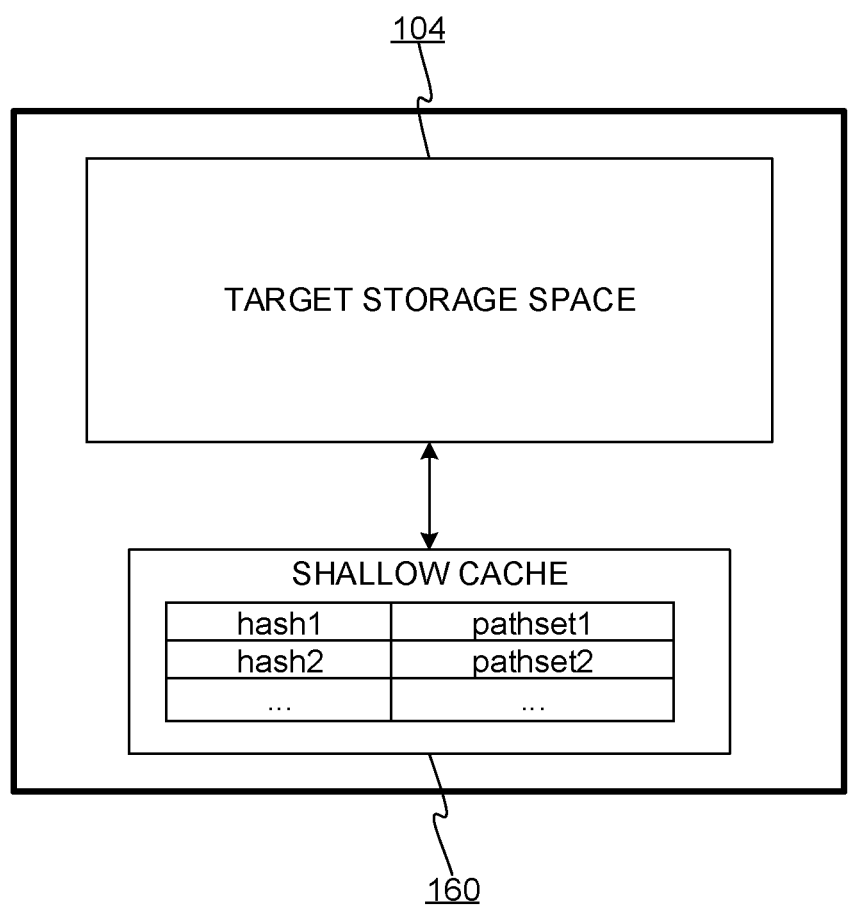
FIG. 4 shows a target storage space supplemented by a shallow cache.

FIG. 4 shows the target storage space 104 supplemented by a shallow cache 160. The shallow cache 160 does not need to cache content units. Rather, the shallow cache 160 tracks the pats in the target storage space 104 that contain the same content units. This may be in the form of a table or file of hashes, where each hash has an associated set of paths. The pathset of a hash in the shallow cache indicates each location in the target storage space 104 where the same content is possibly located. In some embodiments, the shallow cache need not be rigorously maintained. It may not be necessary that the shallow cache 160 continuously reflect the actual content of the target storage space 104. For example, if a content unit listed in the shallow cache 160 is deleted, the shallow cache 160 need not be updated. If content units are added, the shallow cache 160 also does not need to be updated. Alternatively, the shallow cache 160 may be kept update through the underlying implementation of the target storage space 104 (i.e., storage update operations include cache updates) or by learning about accuracy of the shallow cache through its usage.

In effect, the shallow cache 160 indicates at least some of the content units that are likely available in the target storage space 104. As discussed below, the shallow cache 160 may be used to improve the efficiency of replicating a dataset from the source storage space to the target storage space by allowing content units being replicated to be obtained from the target storage space rather than from the source side. As discussed below, the shallow cache may be updated when replicating a dataset to the target storage space; new hashes of inbound content units may be added if they don't already exist, and if they do exist the corresponding pathset may be expanded to include any new locations where such content units are added.

Figure 5:
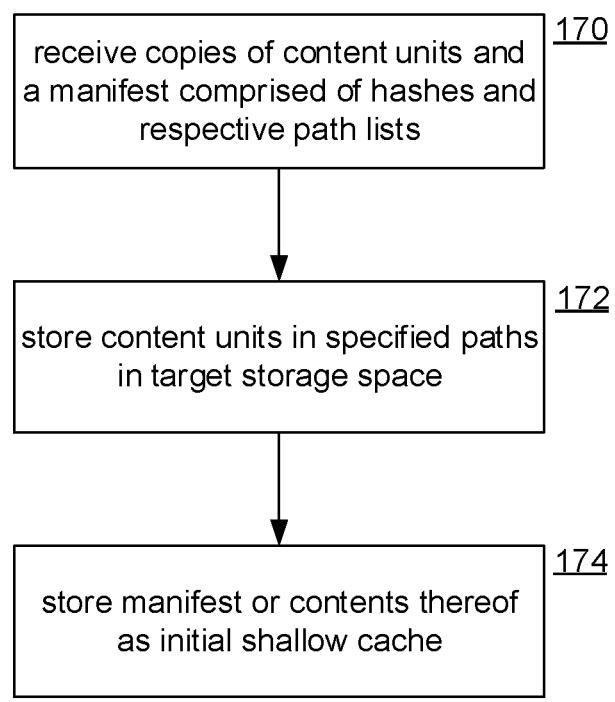
FIG. 5 shows a process for initializing the shallow cache.

FIG. 5 shows a process for initializing the shallow cache 160. The shallow cache 160 may be initialized in a number of ways. In one embodiment (not shown), a completed scan of all content units in the target storage space may be performed. Hashes of each content unit may be computed, and pathsets of same each unique hash constructed. For large content, this may be prohibitive. Another approach is to build up the shallow cache 160 with the content of manifests as respective datasets are added to the target storage space. At step 170, a dataset being replicated is copied in its entirety from the source side. Since initially the shallow cache is empty, when this first dataset is replicated, it is unknown whether there are any local copies of the content units that are to be replicated. Therefore, all of the content units of the dataset are copied from the source. At step 172, the content units from the source are added to the paths in the local storage space as indicated by the dataset's manifest. At step 174, the hash-to-pathset mappings in the manifest are stored in the shallow cache 160. In one embodiment, the manifest itself is just stored as the initial shallow cache. If the storage space is implemented as a filesystem file, the shallow cache may be stored in a special directory and is initialized by storing the manifest in the special directory.

Figure 6:
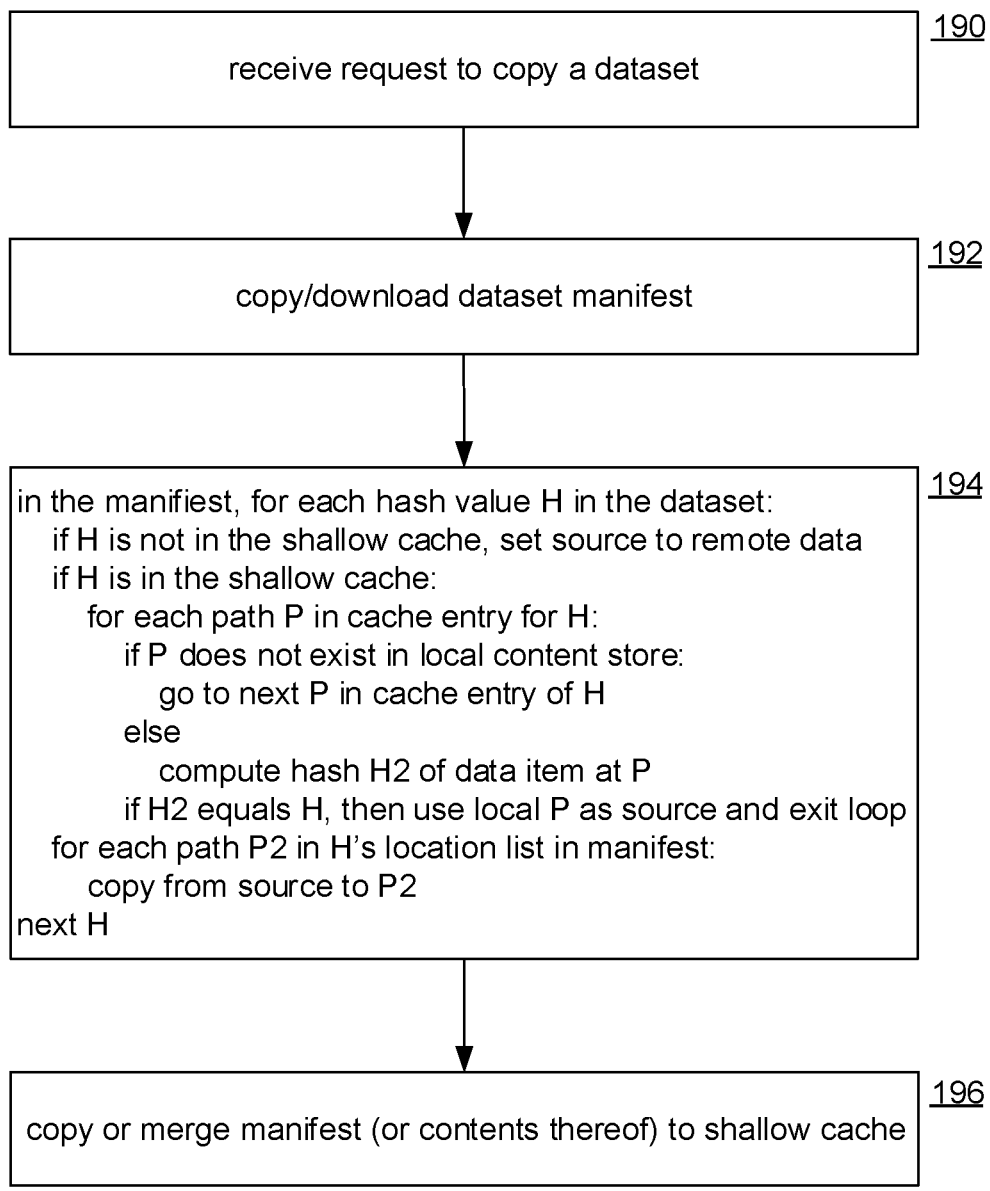
FIG. 6 shows a process for using a shallow cache to replicate a dataset to a target storage space.

FIG. 6 shows a process for using a shallow cache to replicate a dataset to a target storage space. It is assumed that the shallow cache has already been initialized and contains hashes and respective path lists of content units in the target storage space. At step 190 a request is received to copy a dataset. At step 192 the manifest of the dataset is copied or downloaded.

At step 194, the dataset is replicated to the target storage space using the following algorithm. The hashes in the manifest are iterated over. For each hash value H in the manifest, presence of H in the shallow cache is checked. If H is not present, then the source for H's content set to be the source storage space. However, if H is found in the shallow cache, then each of the paths in the path list associated with H in the shallow cache is checked to see if it exists and if a valid copy of the corresponding content unit is present at the path. The first found valid copy is then set to the source that is to be used to obtain the corresponding content unit. Finally, whichever source is to be used for the content unit represented by the current H (i.e., the source storage space or a path in the target storage space), the content unit is copied therefrom to each path associated with H in the manifest. In sum, for each unique unit of content to be replicated, if possible, the content unit is obtained from the target storage space per the shallow cache, and otherwise is obtained from the source side. And, regardless of where the content unit is obtained from, once it is obtained it is copied to the paths for that content unit (hash) as indicated by the manifest.

During step 194 the shallow cache may also be updated. Any paths in the shallow cache that are found to not exist may be deleted from the shallow cache. If a content unit at a path in the shallow cache is found to have a hash that does not match the hash in the shallow cache, then that path in the target storage space is added to the cache (at an existing or new hash/entry, as the case may be).

At step 196, the manifest of the dataset being replicated is used to update the shallow cache. The details of this step will depend on how the shallow cache is implemented. In a filesystem implementation, the manifest may be added to shallow cache directory. In another embodiment, the content of the manifest is logically merged with the shallow cache. This may involve adding to existing cache entries (hash-pathlist pairs) new paths where content units have been added. In another embodiment, manifests or units of cache data may be periodically merged.

Figure 7:
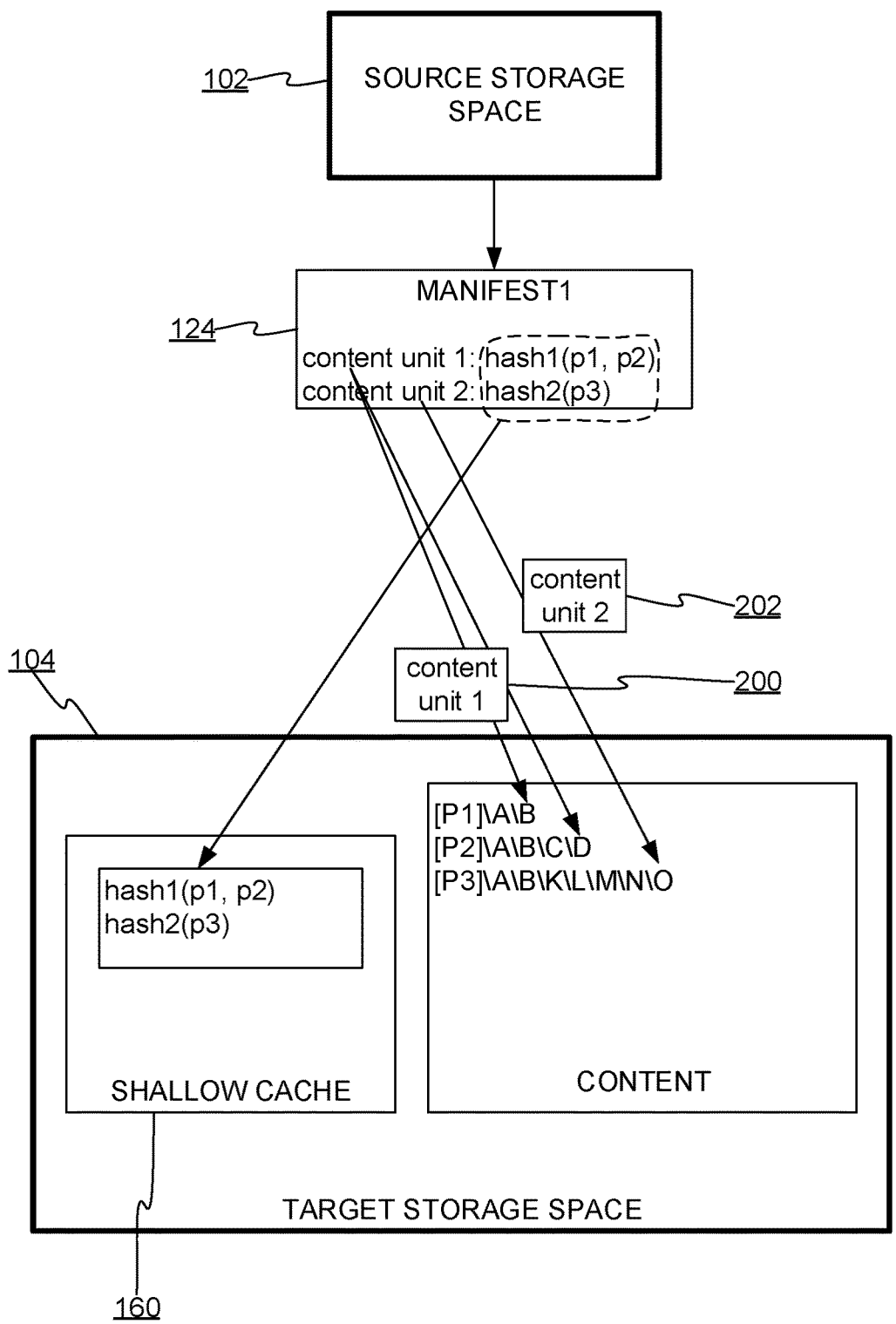
FIG. 7 shows an example of replication that initializes a shallow cache.

FIG. 7 shows an example of replication that initializes a shallow cache. The manifest 124 includes two manifest entries for two respective content units. Content unit 1 200 is represented by a manifest entry that includes hash value hash1 associated with paths p1 and p2 ("\A\B", and "\A\B\C\D", respectively). Content unit 2 202 is represented by a manifest entry that includes hash value hash2 associated with path p3 ("\A\B\K\L\M\N\O"). As per the paths in the manifest, content unit 1 200 is replicated from the source side to paths p1 and p2 in the target storage space, and content unit 2 202 is replicated from the source side to path p3 in the target storage space. The manifest or the hash-path data therefrom is the initial shallow cache data.

Figure 8:
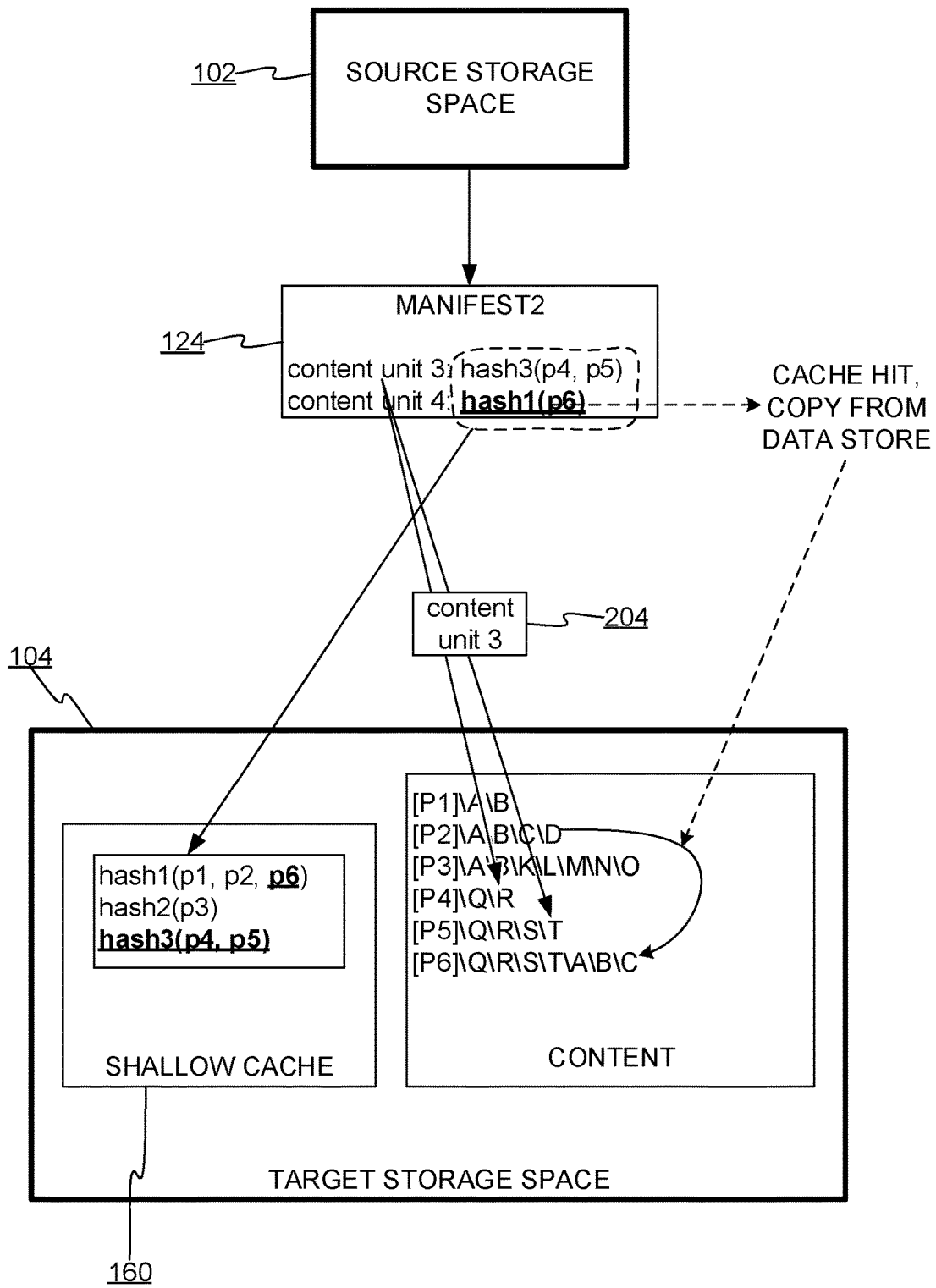
FIG. 8 shows an example of using a shallow cache for replicating a dataset.

FIG. 8 shows an example of using a shallow cache for replicating a dataset. This example builds on the example shown in FIG. 7. In this example, the manifest 124 includes entries representing content unit 3 and content unit 4. As shown in the manifest, content unit 3 is represented by hash3 in association with paths p4 and p5, and content unit 4 is represented by hash1 in association with path p6. The manifest entry for content unit 3 204 is processed first. Hash3 is checked for presence in the shallow cache 160. Because it is not found, content unit 3 is copied from the source side to paths p4 and p5, and hash3 along with paths p4 and p5 are added to the shallow cache (which now reflects the added content).

The manifest entry for content unit 4 is processed next. Hash1 is searched for in the shallow cache and is found. A path in the corresponding cache entry is selected (e.g., randomly), in this example, path p2 is selected from hash1's cache entry. The content unit stored at path p2 in the target storage space is copied to new path p6 ("\Q\R\S\T\A\B\C") as specified in the manifest (if other paths were specified, they would also be created and receive copies). Thus, a copy from the source side is avoided. In addition, path p6 is added to the cache entry of hash1. If path p2 did not exist or did not contain a content unit hashed to hash1, then p2 would have been deleted from the hash1 cache entry and another path in the hash1 cache entry (e.g., p1) would have been tried. If no valid paths existed, the cache entry could be deleted and content unit 4 copied from the source side.

As noted above, in one embodiment, new cache entries are added without concern for possible hash duplication, and deduplication is performed when convenient.

As also noted above, the storage spaces may be realized in many forms. They may be filesystems, data structures in a same virtual or physical memory space, cloud storage services, database elements, and so forth. Replication may be between devices via a network, for instance, or between storage spaces on a same device.

Figure 9:
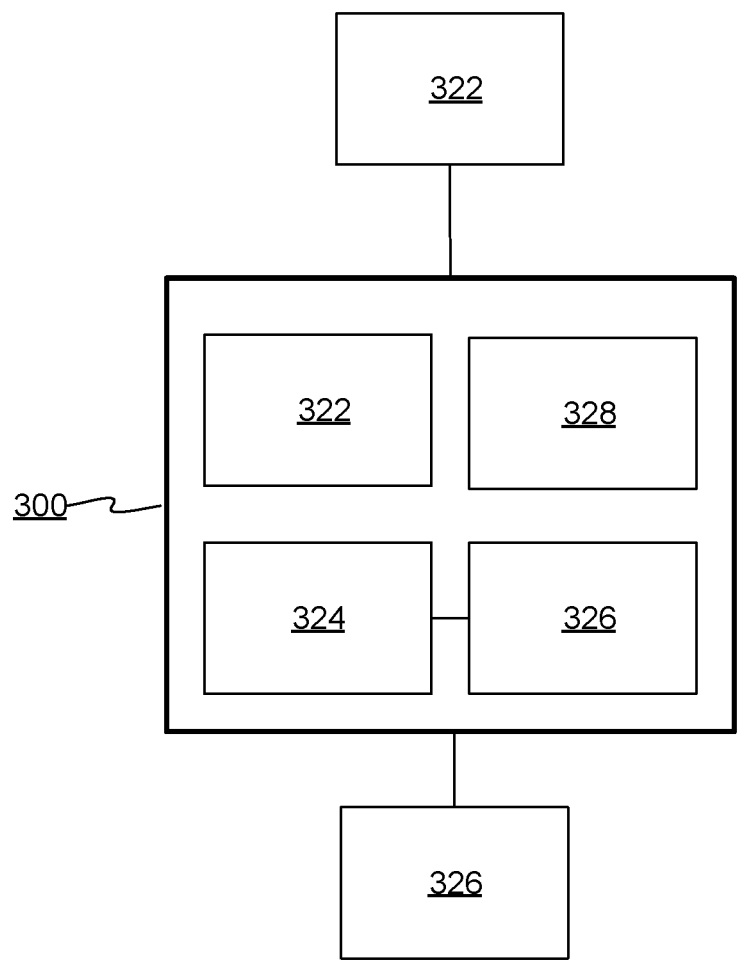
FIG. 9 shows details of a computing device on which embodiments described herein may be implemented.

FIG. 9 shows details of a computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 (possibly via cloud APIs) to implement the embodiments described herein.

The computing device 300 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising processing hardware and storage hardware, the method comprising:
    storing, in the storage hardware, a local data store comprised of local data items having respective unique storage paths where they are stored in the local data store;
    maintaining a shallow cache comprised of cache entries, each cache entry representing a respective local data item in the local data store, each cache entry comprising a hash of the correspondingly represented local data item and comprising a set of paths where respective copies of the local data item are stored in the local data store;
    determining to add a dataset from a remote device to the data store, the dataset represented by a manifest comprising a list of manifest entries, each manifest entry comprising a hash of a respective remote data item at the remote device and a set of paths where respective copies of the remote data item are stored on the remote device;
    based on determining to add the dataset from the remote device to the data store, adding the dataset by:
        for each manifest entry in the manifest, determining whether any cache entry contains the hash of the manifest entry; and
        when a cache entry is determined to contain a hash of a manifest entry, copying a local data item (i) from a path in the cache entry's set of paths (ii) to each of the paths in the manifest entry's set of paths.

2. A method according to claim 1, wherein when determined that no cache entry contains the hash of the manifest entry, copying a corresponding remote data item to the local data store at the paths in the manifest entry's path set.

3. A method according to claim 1, further comprising determining that a given hash in the manifest is present in a given cache entry in the shallow cache, determining that each of the paths in the set of paths in the given cache entry do not contain a given data item that corresponds to the given hash, and based thereon copying the given data item from the remote device to the local data store and updating the shallow cache accordingly.

4. A method according to claim 1, wherein the local data store comprises a filesystem, the data items in the data store comprises files in the filesystem, and the paths in the sets of paths in the cache entries comprises filepaths in the file system.

5. A method according to claim 1, further comprising determining to copy another dataset from the remote device, accessing a second manifest corresponding to the other dataset, and adding hashes and paths from the second manifest to the shallow cache.

6. A method according to claim 1, further comprising allowing data items to be deleted from the local data store without requiring corresponding updates to the shallow cache.

7. A method according to claim 1, further comprising receiving multiple manifests for respective datasets and consolidating paths thereof that are associated with same hashes in the manifests.

8. A computing device comprising:
    processing hardware configured to interoperate with storage hardware;
    the storage hardware, the storage hardware storing instructions configured to, when executed by the processing hardware, cause the computing device to perform a process comprising:
        providing a content-addressable storage that stores a hierarchy of files, each file stored at a respective unique path in the hierarchy of files, wherein instances of same files are stored at different respective unique paths in the hierarchy of files;
        maintaining a shallow cache comprised of hashes of files in the hierarchy of files, the shallow cache further comprised of path lists associated with the hashes, respectively, each path list associated with a respective hash comprising a list of one or more paths in the hierarchy of files storing one or more respective instances of the file corresponding to the hash, wherein at least some of the path lists comprise multiple paths; and
        adding files to respective new paths in the content-addressable storage by, each time a file is to be added to one or more new paths in the content-addressable storage, determining if a hash of the file is present in the shallow cache, wherein when a file's hash is determined to be present in the shallow cache the file is copied from a path in the corresponding path list to each of the corresponding new paths.

9. A computing device according to claim 8, wherein when a file's hash is determined to not be present in the shallow cache the file is copied from a remote source to each of the new paths that correspond to the file.

10. A computing device according to claim 8, wherein files in the content-addressable storage that have respective hashes and path lists in the shallow cache are allowed to be deleted without correspondingly updating the shallow cache.

11. A computing device according to claim 10, wherein when a path list in the shallow cache is used to add a new instance of the corresponding file to the content-addressable storage, a path in the path list is determined to not exist and based thereon another path in the path list is used as a source to add the new instance of the corresponding file.

12. A computing device according to claim 9, wherein the files being added to the content-addressable storage are obtained from a remote server via a network, and wherein the remote server is part of a cloud service and the files being added are identified by the cloud service.

13. A computing device according to claim 8, the process further comprising, when adding a new file to the content-addressable storage using the shallow cache, determining that a path in a path list in the shallow cache is invalid and based thereon removing the path from the path list.

14. A computing device according to claim 8, wherein when a file and corresponding new paths are being added to the content-addressable storage, each path in the new paths is added to the content-addressable storage and each added path in the new paths comprises a location where an instance of the file is stored.

15. Computer-readable storage hardware storing instructions configured to cause a computing device to perform a process, the storage hardware not comprising a signal, the process comprising:

maintaining a storage comprised of content units, each content unit stored at a full path, each full path belonging to a same namespace, wherein some of the full paths contain instances of a same respective content unit;

maintaining a location cache that indicates which content units are stored at which full paths in the storage, wherein, given an arbitrary content unit, full paths where respective instances of the arbitrary content unit are stored in the storage can be obtained based on a hash of the arbitrary content unit;

receiving a first request to add a first target content unit to the storage at first target full paths in the namespace;

responding to the first request by obtaining a first target hash of the first target content unit, obtaining a source full path from the location cache based on the target hash, and using the obtained source full path to copy a content unit at the source full path to each of the target full paths.

16. Computer-readable storage hardware according to claim 15, wherein the location cache comprises hashes of respective content units, and wherein the source full path is obtained from the location cache by searching for the first target hash in the location cache.

17. Computer-readable storage hardware according to claim 15, the process further comprising receiving a second request to add a second target content unit to the storage at second target full paths in the namespace, determining that the location cache does not contain a valid location of the second target content unit, and based thereon copying the second target content unit from a remote storage to the storage at the second target full paths.

18. Computer-readable storage hardware according to claim 15, the process further comprising receiving a second request to add a second target content unit to the storage at second target full paths in the namespace, determining that the location cache contains a candidate full path corresponding to a hash of the second target content unit, and computing a hash of a content unit stored at the candidate full path.

19. Computer-readable storage hardware according to claim 18, the process further comprising determining that the computed hash of the content unit at the candidate full path does not match a hash of the second target content unit and based thereon determining not to use the content unit at the candidate full path to satisfy the second request.

20. Computer-readable storage hardware according to claim 15, a set of full paths in an entry in the cache includes a path that does not contain a content unit matching the hash associated with the entry.

* * * * *